United States Patent Office 2,785,169
Patented Mar. 12, 1957

2,785,169

PURIFICATION PROCESS FOR PYRIDINE DERIVATIVE (VITAMIN B₆)

John Edson Gordon, Middlesex, N. J., assignor to American Cyanamid Company, New York, N. Y., a corporation of Maine No Drawing. Application October 26, 1955,
Serial No. 543,035

5 Claims. (Cl. 260—294.9)

This invention relates to a process of purifying 2-hydroxy-3,4-dicyano-5-nitro-6-methylpyridine, and to certain new salts thereof.

2-hydroxy-3,4-dicyano-5-nitro-6-methylpyridine is an intermediate in the preparation of 2-methyl-3-hydroxy-4,5-bis-(hydroxymethyl)-pyridine which is commonly known as pyridoxine or vitamin B₆. The intermediate is commonly known in the art as "nitro compound" and throughout the general part of this specification will be referred to by this simpler designation.

Pyridoxine requires an extensive synthesis and of course must be obtained in a very high degree of purity necessitated by its use in vitamin supplements and the therapy of vitamin deficiency. The requirement for high purity and the many chemical steps render the process extremely costly.

The synthesis of pyridoxine starting with the nitro compound involves replacement of the hydroxyl group by chlorine, reduction to remove the chlorine and reduce the two cyano groups to aminomethyl and the nitro group to an amino producing the compound which is generally known as the triamine, and finally the transformation of amino groups in the triamine into hydroxy groups to produce the final pyridoxine. The synthesis is shown by the following general equation:

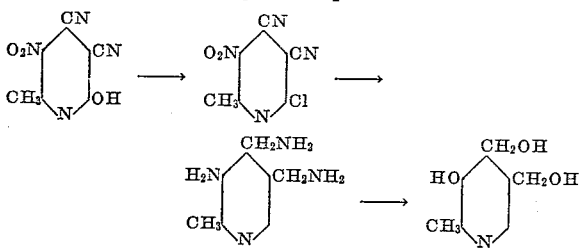

The synthesis of the nitro compound forms no part of the present invention as it is effected by known means. However, the product produced is by no means pure. The purity of the nitro compound vitally affects the yields of the triamine although not greatly changing the yields in the intermediate step of producing the corresponding chloro compound. The effect of remaining impurities and their nature is not completely known and the present invention is therefore not limited to any theory of their chemical nature or of exactly how they act in the synthesis, and particularly in the step of reducing the chlorinated nitro compound to the triamine.

While it was known that a very pure nitro compound is of advantage in producing higher yields of the triamine in a high degree of purity, these advantages have not been practically realizable in large scale production. The only methods of purifying the nitro compound which have hitherto been known have been recrystallization from organic solvents such as acetone, an expensive process requiring large solvent recovery equipment, and representing a serious fire hazard in plant use.

It had also been proposed to dissolve the nitro compound in a solution of caustic soda and reprecipitate it by acidification. This, however, effected no purification as all of the impurities which cause trouble in the further synthesis are also reprecipitated and hence no net purification results. Because of the excessive cost and other difficulties in the purification step, it has not been used in the large scale production of pyridoxine, and on the contrary, the crude nitro compound has been used in spite of the lowered yields resulting.

The present invention is based on the discovery that it is possible to produce and isolate in solid form salts of the nitro compound with alkali-forming elements and radicals, namely, alkali metals, alkaline earth metals, and ammonium. The production of the salts is effected by solution of the nitro compound in aqueous solutions of the corresponding hydroxide such as ammonium hydroxide, sodium hydroxide, potassium hydroxide, calcium hydroxide, barium hydroxide, etc. It is also possible to effect solution with the alkali metal carbonates and bicarbonates such as the carbonates and bicarbonates of sodium and potassium, and the di- and tri-sodium phosphates. From these solutions the salts are precipitated by adjusting the pH to between 7 and 9.5. When so precipitated the impurities which cause difficulties in the further synthesis remain in solution and the salts of the nitro compound are therefore isolated in a form in which they are free or substantially free from impurities.

After the salts have been isolated they are redissolved in water and are then transformed into the free nitro compound by lowering the pH below 5 and preferably in the range of from 3 to 3.5. The nitro compound then precipitates out and when used in the synthesis of pyridoxine produces improved yields of the triamine of higher purity although it does not materially affect the yields in the chlorination step. A much purer product at this point is, however, obtained and results in much higher yields of the triamine.

The means used to adjust the pH first to the range of 7 to 9.5 in order to precipitate the salts of the nitro compound and in the second step to the lower pH required to precipitate the nitro compound from the redissolved salt solution are not critical. Any acid may be used, for example, mineral acids such as hydrochloric and sulfuric acids, organic acids such as acetic acid, propionic acid and the like. For practical purposes hydrochloric and acetic acids are preferable.

The particular salt produced is also not critical but for smoothness of reaction and economic considerations, it is preferred to use ammonium hydroxide, calcium hydroxide or sodium carbonate rather than the other alkalies.

The precipitation of the salts results in part from a salting out effect caused by the salts of the cations of the bases with the acids used for acidification or adjustment of pH. Additional amounts of salt can of course be used to enhance the salting out effect and such modifications are included within the scope of the invention. The amount of water in which the initial solution of the salts of the nitro compound is effected is not critical. Obviously for economic reasons, it is desirable to keep the amount of water at a minimum but larger amounts of water do not create serious problems, requiring only the addition of further amounts of salts for salting out. It goes without saying that the cations in the first step must be present in at least sufficient amounts to form the salts of the nitro compound. An excess does no harm but a large excess is economically undesirable as it does not improve the process and consumes larger amounts of acid in adjustment of the pH.

The invention will be described in greater detail in connection with the following specific examples in which the parts are by weight unless otherwise specified.

Example 1

To a solution of 292 parts of 28% ammonium hydroxide and 325 parts of water is added 200 parts of anhydrous nitro compound. The mixture is stirred until solution is complete, 12 parts of a filter aid are added and the mixture is then clarified. The solid cake is washed with 90 parts of 14% ammonium hydroxide solution. The combined filtrate and washings are then cooled in an ice bath and concentrated hydrochloric acid is added until the pH of the mixture reaches a value of about 8.6. The acid is added at such a rate that the temperature does not exceed 40° C. The resulting slurry is then cooled to less than 5° C. and the solid ammonium salt of the nitro compound is removed by filtration and washed with saturated ammonium chloride solution.

The ammonium salt of the nitro compound is then dissolved in 1200 parts of water at about 25–30° C. Concentrated hydrochloric acid is added to a pH of about 3–3.5. The solid nitro compound which precipitates is removed by filtration and dried, giving 176 parts of product.

A recovery of approximately 92% was obtained of a product having a purity of about 97%.

Example 2

The procedure of Example 1 is followed except that 15 parts of glacial acetic acid is added before the nitro compound is precipitated by the addition of the hydrochloric acid.

The purified nitro compound was obtained with a recovery of 92.5% and of a purity slightly above 98%.

Example 3

The procedure of Example 1 is followed except that 35 parts of acetone is added just before precipitation of the nitro compound by the addition of hydrochloric acid.

A nitro compound was recovered with a yield of 93.5% and a purity in excess of 97%.

Example 4

The procedure of Example 1 is followed except that the crude nitro compound is dissolved in 720 parts of 28% ammonium hydroxide with no additional water.

The nitro compound was obtained with a recovery of somewhat over 88% and purity of almost 99%.

Example 5

The procedure of Example 1 was followed except that excess saturated ammonium chloride solution is added until the precipitation of the ammonium salt is complete, without the addition of any acid.

Example 6

To 1000 parts of water, at room temperature, is added 200 parts of crude nitro compound. Solid calcium hydroxide is added to the resulting slurry until a strong red spot on phenol phthalein test paper is obtained. Concentrated hydrochloric acid is then added to the resulting solution at 20° C. until a pH of 8 is reached; 200 parts of calcium chloride is then added and the pH is then again adjusted to about 8. The calcium salt of the nitro compound precipitates as a solid and is removed by filtration.

The calcium salt is then dissolved in 3000 parts of water. Decolorizing charcoal is added and the mixture is clarified. To the filtrate is added 25 parts of glacial acetic acid followed by the addition of concentrated hydrochloric acid until a bright blue spot results on Congo red test paper (pH of about 3–3.5). The precipitate of nitro compound which forms is removed by filtration at room temperature and washed with water until free of chlorides. A high recovery of pure nitro compound results.

The nitro compound was obtained with a recovery of 97.7% and a purity of 97.6%. This should be contrasted with the crude starting material which had a purity of about 90.5%.

Example 7

To 1000 parts of water is added 330 parts of crude nitro compound. With vigorous agitation, 200 parts of sodium carbonate is slowly added at room temperature; this causes all of the nitro compound to go into solution. The solution is then clarified and 400 g. of sodium chloride is added to the filtrate. The sodium salt of nitro compound which precipitates is removed by filtration, sucked as dry as possible, and washed with 200 parts of saturated sodium chloride solution. The sodium salt of nitro compound is then dissolved in 2500 parts of water at room temperature; glacial acetic acid is added with stirring until crystals start to appear and then concentrated hydrochloric acid is added to a pH of about 3–3.5. The nitro compound precipitates and is removed by filtration and washed chloride-free with water. It is dried to a constant weight at 50–55° C., giving a good recovery of excellent quality material.

A recovery of purified nitro compound of an excess of 93% was obtained, the material being 97.7% pure.

I claim:

1. A process for the purification of a pyridine compound represented by the formula:

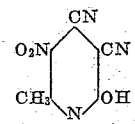

which comprises forming an aqueous solution of a salt of the compound the cation of which is selected from the group consisting of alkali metals, alkaline earth metals and ammonium, isolating the salt, redissolving the salt in water and precipitating the compound by acidification.

2. A process according to claim 1 in which a solution of the salt is filtered to remove insoluble impurities before isolating the salt.

3. A process according to claim 2 in which the salt is isolated by adjusting the pH to 7–9.5, precipitating the salt and recovering it in solid form.

4. A process according to claim 1 in which the pyridine compound is dissolved in ammonium hydroxide which is added to an aqueous slurry of the compound.

5. A process according to claim 1 in which calcium hydroxide is added to an aqueous slurry of the pyridine compound to form a solution of the calcium salt.

References Cited in the file of this patent

UNITED STATES PATENTS

| | | |
|---|---|---|
| 2,310,167 | Carlson | Feb. 2, 1943 |
| 2,310,171 | Carlson | Feb. 2, 1943 |
| 2,310,172 | Carlson | Feb. 2, 1943 |